(12) United States Patent
Cho et al.

(10) Patent No.: US 11,562,670 B2
(45) Date of Patent: Jan. 24, 2023

(54) ELECTRONIC DEVICE WITH ILLUMINANCE SENSOR MOUNTED AT BACK SIDE OF DISPLAY AND METHOD FOR MEASURING ILLUMINANCE USING ILLUMINANCE SENSOR

(71) Applicant: Samsung Electronics Co., Ltd., Gyeonggi-do (KR)

(72) Inventors: Jeongho Cho, Gyeonggi-do (KR); Kyusung Kim, Gyeonggi-do (KR); Jongah Kim, Gyeonggi-do (KR); Heewoong Yoon, Gyeonggi-do (KR); Donghan Lee, Gyeonggi-do (KR); Yoomi Tak, Gyeonggi-do (KR); Sangmin Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/709,008

(22) Filed: Dec. 10, 2019

(65) Prior Publication Data

US 2020/0242985 A1 Jul. 30, 2020

(30) Foreign Application Priority Data

Jan. 29, 2019 (KR) .......................... 10-2019-0011238

(51) Int. Cl.
*G09G 3/00* (2006.01)
*G09G 3/3283* (2016.01)
(Continued)

(52) U.S. Cl.
CPC ........... *G09G 3/006* (2013.01); *G06F 1/1605* (2013.01); *G06F 3/0412* (2013.01);
(Continued)

(58) Field of Classification Search
CPC .... G09G 3/006; G09G 3/3233; G09G 3/3283; G09G 3/3208; G09G 2300/0842;
(Continued)

(56) References Cited

U.S. PATENT DOCUMENTS 7,825,891 B2 11/2010 Yao et al.
8,194,031 B2 6/2012 Yao et al.
(Continued)

FOREIGN PATENT DOCUMENTS

KR 10-2013-0057705 A 6/2013
KR 10-2017-0090951 A 8/2017
(Continued)

OTHER PUBLICATIONS

International Search Report dated Mar. 17, 2020.
European Search Report dated Nov. 8, 2021.

*Primary Examiner* — Jimmy H Nguyen
(74) *Attorney, Agent, or Firm* — Cha & Reiter, LLC

(57) ABSTRACT

Provided is an electronic device. The electronic device includes a housing that includes a front side and a back side, a display, an illuminance sensor overlapping at least one active area of the display in a top view from above the front side, at least one processor, and a memory. The memory stores instructions that, when executed, cause the at least one processor, while the display is in operation, to change a brightness of a screen displayed on the display, to identify display parameter information associated with the changed brightness, to set a measuring time of the illuminance sensor, based at least partially on the identified display parameter information, to acquire raw data measured during the measuring time by the illuminance sensor at a specified period, to generate intermediate data using the acquired raw data, and to calculate an illuminance value using the generated intermediate data.

15 Claims, 14 Drawing Sheets

(51) Int. Cl.
*G09G 3/3233* (2016.01)
*G06F 1/16* (2006.01)
*G06F 3/041* (2006.01)

(52) U.S. Cl.
CPC ......... *G09G 3/3233* (2013.01); *G09G 3/3283* (2013.01); *G09G 2300/0842* (2013.01); *G09G 2320/0233* (2013.01); *G09G 2320/043* (2013.01)

(58) Field of Classification Search
CPC ..... G09G 2320/043; G09G 2320/0233; G09G 2320/0626; G09G 2360/14; G09G 2360/144; G09G 2360/145; G06F 3/0412; G06F 1/1605; G06F 1/1637
USPC ............................ 345/207, 690, 77; 324/537
See application file for complete search history.

(56) References Cited

U.S. PATENT DOCUMENTS

| | | | |
|---|---|---|---|
| 9,448,665 B2 | 9/2016 | Lee et al. | |
| 2005/0110021 A1* | 5/2005 | Park | H01L 51/5209 257/72 |
| 2007/0279369 A1 | 12/2007 | Yao et al. | |
| 2011/0032285 A1 | 2/2011 | Yao et al. | |
| 2012/0218239 A1 | 8/2012 | Yao et al. | |
| 2013/0135257 A1 | 5/2013 | Lee et al. | |
| 2014/0132158 A1* | 5/2014 | Land | H05B 47/10 315/149 |
| 2015/0241732 A1* | 8/2015 | Kim | G02F 1/1341 349/110 |
| 2017/0045987 A1* | 2/2017 | Li | G06F 3/044 |
| 2017/0221450 A1 | 8/2017 | Kim et al. | |
| 2017/0229059 A1* | 8/2017 | Bonnier | G06F 3/017 |
| 2018/0061313 A1 | 3/2018 | Jang et al. | |
| 2018/0063435 A1* | 3/2018 | Cho | H04N 5/23248 |
| 2018/0348049 A1* | 12/2018 | Yoon | G01J 1/0233 |
| 2019/0235608 A1 | 8/2019 | Shin et al. | |

FOREIGN PATENT DOCUMENTS

| | | |
|---|---|---|
| KR | 10-2018-0024526 A | 3/2018 |
| KR | 10-2018-0038789 A | 4/2018 |
| KR | 10-2018-0052246 A | 5/2018 |
| KR | 10-1891294 B1 | 9/2018 |
| KR | 10-2018-0131848 A | 12/2018 |

* cited by examiner

ELECTRONIC DEVICE WITH ILLUMINANCE SENSOR MOUNTED AT BACK SIDE OF DISPLAY AND METHOD FOR MEASURING ILLUMINANCE USING ILLUMINANCE SENSOR

CROSS-REFERENCE TO RELATED APPLICATION(S)

This application is based on and claims priority under 35 U.S.C. § 119 to Korean Patent Application No. 10-2019-0011238, filed on Jan. 29, 2019, in the Korean Intellectual Property Office, the disclosure of which is incorporated by reference herein its entirety.

BACKGROUND

1. Field

The instant disclosure generally relates to an electronic device with an illuminance sensor mounted at a back side a display, and relates to a technique of measuring illuminance using the illuminance sensor.

2. Description of Related Art

Recently market forces have prompted device manufacturers to design electronic devices such as smart phones with large displays, to the point where the display constitutes substantially the entire front side of the electronic device. Conventionally, a camera module or a sensor module may be disposed at the front edge of the display adjacent to the display. The aforementioned sensor module may be an illuminance sensor that measures external illuminance, and it may be mounted at the back side of the display. For example, when the size of the display is increased to minimize the black matrix (BM) area at the edge of the electronic device, the illuminance sensor may be mounted at the back side of the display.

The above information is presented as background information only to assist with an understanding of the disclosure. No determination has been made, and no assertion is made, as to whether any of the above might be applicable as prior art with regard to the disclosure.

SUMMARY

An illuminance sensor mounted at the back side of the display may have deteriorated performance due to a display. For example, the illuminance sensor may be affected by light that is output by the display. When the illuminance sensor is measuring illuminance at the same time as when the display outputs light, accuracy of the measured illuminance may decrease. As another example, because the front side of the illuminance sensor is hidden by the display, external light that is input into the illuminance sensor may be reduced, thereby decreasing the performance of the illuminance sensor.

In accordance with an aspect of the disclosure, an electronic device includes a housing including a front side and a back side facing in a direction opposite to the front side, a display contained within the housing and be visible through a portion of the front side, an illuminance sensor disposed between the display and the back side to overlap at least one active area of the display in a top view from above the front side, at least one processor positioned inside the housing and operatively connected to the display and the illuminance sensor, and a memory positioned within the housing and operatively connected to the at least one processor. The memory stores instructions that, when executed, cause the at least one processor, while the display is in operation, to change a brightness of a screen displayed on the display, to identify display parameter information associated with the changed brightness, to set a measuring time of the illuminance sensor, based at least partially on the identified display parameter information, to acquire raw data measured during the measuring time by the illuminance sensor at a specified period, to generate intermediate data using the acquired raw data, and to calculate an illuminance value using the generated intermediate data.

In accordance with another aspect of the disclosure, a method for measuring an illuminance using an illuminance sensor by an electronic device includes changing a brightness of a screen displayed on a display, identifying display parameter information associated with the changed brightness, setting a measuring time of the illuminance sensor, based at least partially on the identified display parameter information, acquiring raw data measured during the measuring time by the illuminance sensor at a specified period, generating intermediate data using the acquired raw data, and calculating an illuminance value using the generated intermediate data.

In accordance with another aspect of the disclosure, an electronic device includes a housing including a front side and a back side facing in a direction opposite to the front side, a display contained within the housing and to be visible through a portion of the front side, an image sensor disposed in at least a portion of a black matrix area surrounding an active area of the display, an illuminance sensor mounted on a portion of the back side of the display adjacent to the image sensor to overlap at least a portion of the active area of the display in a top view from above the front side, at least one processor operatively connected to the display, the image sensor, and the illuminance sensor, and a memory positioned within the housing and operatively connected to the at least one processor. The memory stores instructions that, when executed, cause the at least one processor, while the display is in the operation, when the brightness of the display is changed, to transfer an AOR (AMOLED off ratio) to the illuminance sensor in real time, where the AOR is a ratio corresponding to when the display is turned off in association with the changed brightness, to set a measuring time at which the illuminance sensor receives raw data, using the AOR, to acquire the raw data measured during the measuring time by the illuminance sensor at a specified period, generate intermediate data including a lowest value of the raw data, and to calculate an average of values excluding the lowest value as an illuminance value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
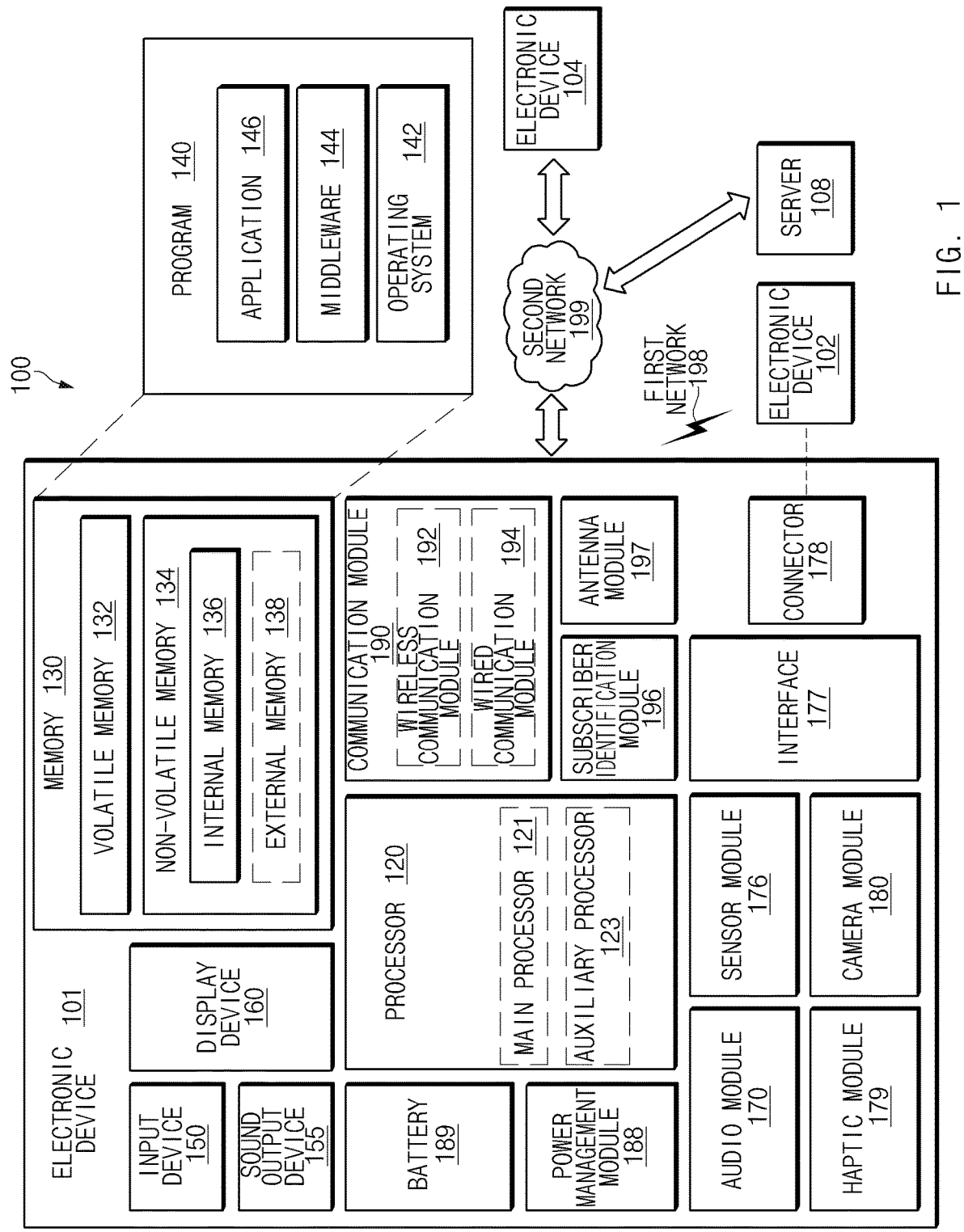
FIG. 1 is a block diagram illustrating an electronic device in a network environment according to various embodiments.

Hereinafter, some embodiments of the disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the disclosure, a detailed description of well-known features or functions will be ruled out in order not to unnecessarily obscure the gist of the disclosure.

Aspects of the instant disclosure are to address at least the above-mentioned problems and/or disadvantages and to provide at least the advantages described below. Accordingly, an aspect of the disclosure is to provide an electronic device with an illuminance sensor mounted at a back side of a display, and a method of accurately measuring an illuminance value using the illuminance sensor.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
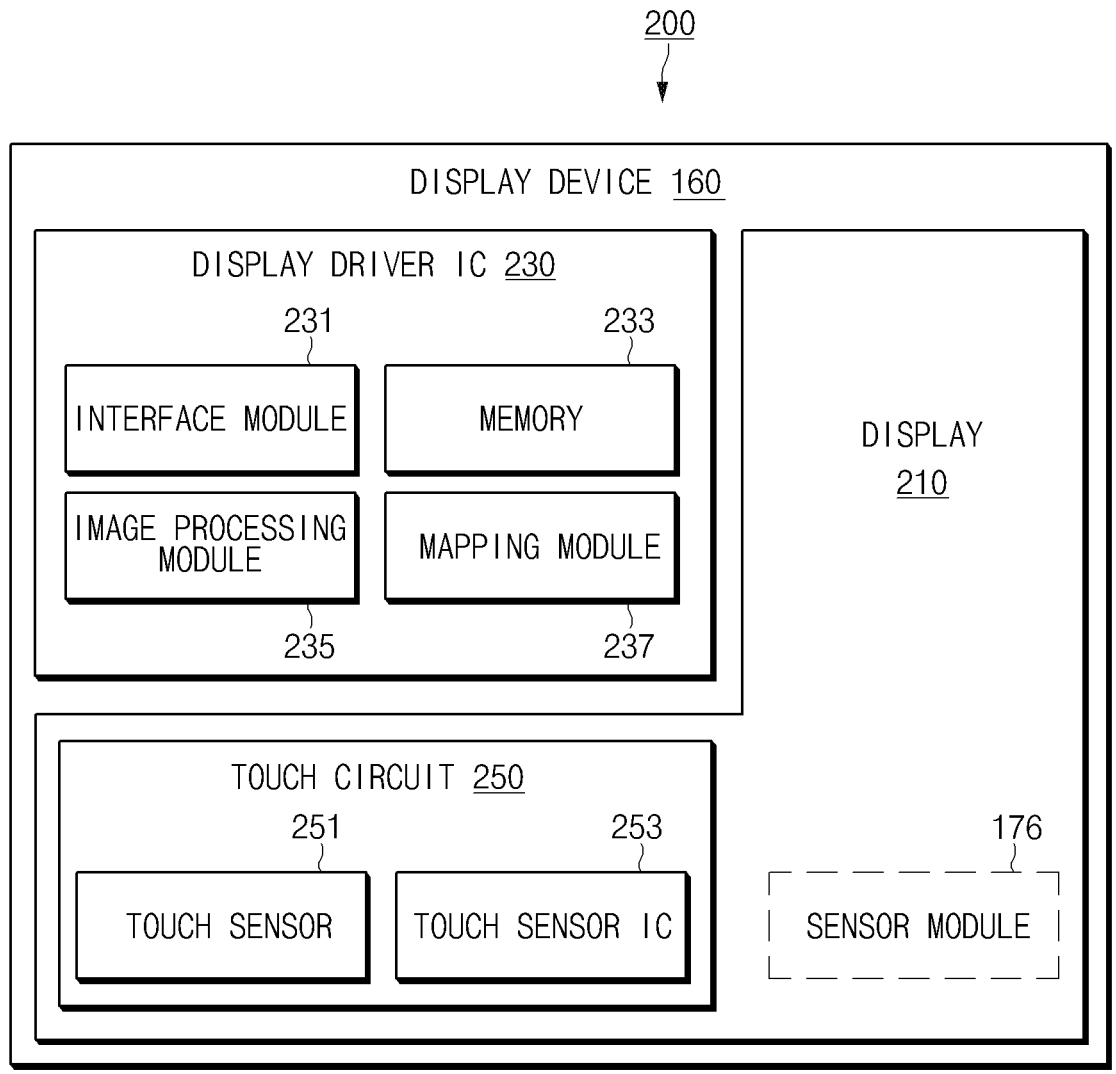
FIG. 2 is a block diagram illustrating a display device according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
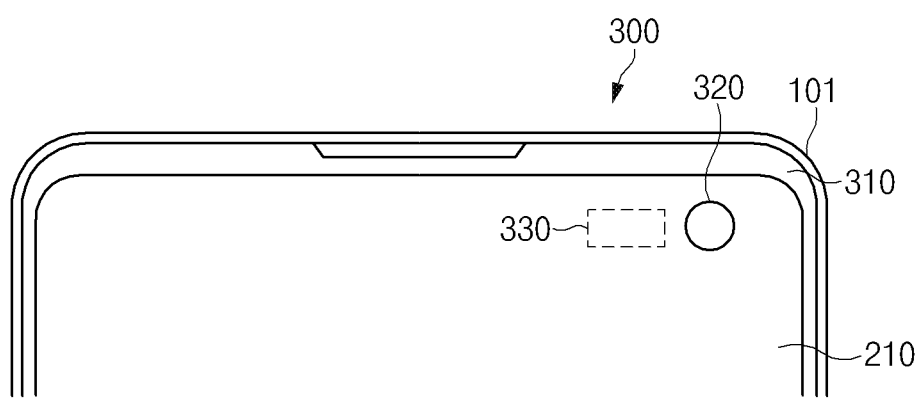
FIGS. 3A to 3C are diagrams illustrating an electronic device having an illuminance sensor mounted at a back side of a display according to certain embodiments.
Figure 3B:
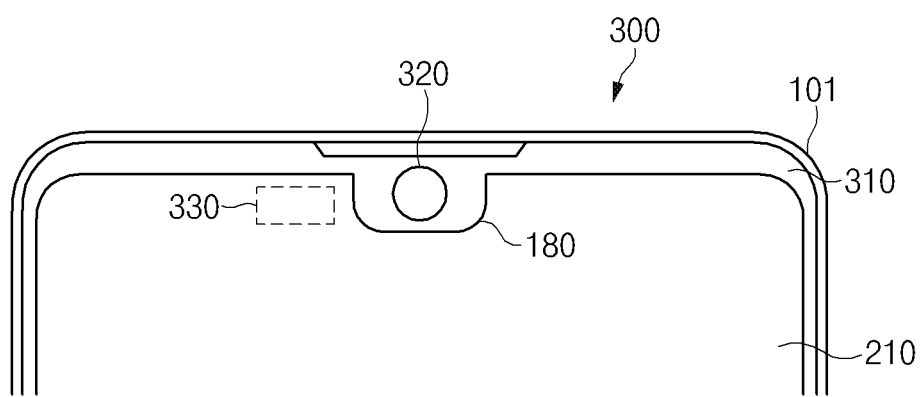
Figure 3C:
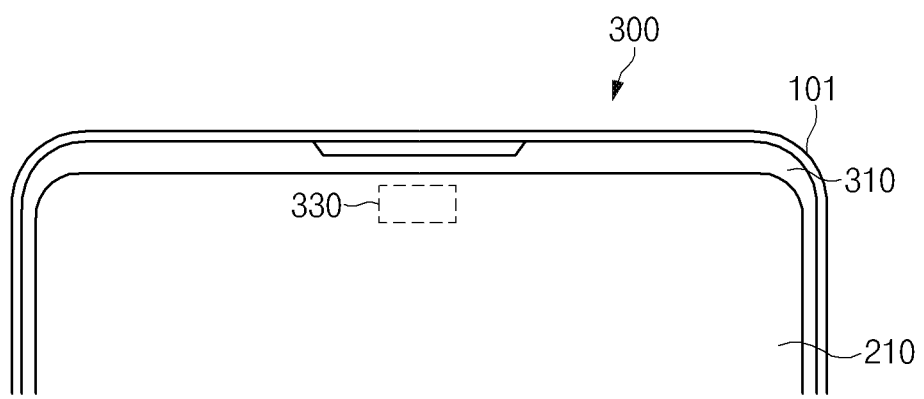

FIGS. 3A to 3C are diagrams 300 illustrating the electronic device 101 having an illuminance sensor 330 mounted at a back side of the display 210 according to certain embodiments.

According to an embodiment, the electronic device 101 may include a housing 310. The housing 310 may include a front side and a back side that faces in a direction opposite to the front side of the electronic device 101. The housing 310 may define the shape of the electronic device 101. A processor (e.g., the processor 120 of FIG. 1) and a memory (e.g., the memory 130 of FIG. 1) of the electronic device 101 may be positioned inside the housing 310. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the display 210 may be contained in the housing 310. The display 210 may be seen through a portion of the front side of the housing 310. The display 210 may be disposed at the front center of the electronic device 101. The display 210 may display a screen. A black matrix (BM) area may be disposed at the periphery of the display 210. The BM area may be referred to as a side bezel that surrounds the edge of the display 210 in the housing.

According to an embodiment, as illustrated in FIG. 3A, an image sensor 320 (e.g. a camera) may be disposed in the display 210. For example, the image sensor 320 may be disposed inside an upper right area of an edge area of the display 210. To place the image sensor 320 inside display 210, a hole-punch display in which a hole is formed in the active area (A/A) of the display 210 may be implemented.

According to another embodiment, as illustrated in FIG. 3B, the image sensor 320 of the camera module 180 may be disposed in at least a portion of the BM area surrounding the display 210. The camera module 180 and the image sensor 320 may be disposed in a notch in the upper center area of the BM area of the display 210. That is, the BM area may be extended or cut into the active area of the display 210 to form a notch, and the camera module 180 and the image sensor 320 may be disposed in the notch. The image sensor 320 may acquire images to be captured by the camera module 180. The image sensor 320 may acquire visual information such as brightness, saturation, hue, and shape of an external object facing the front side of the electronic device 101 whose image is to be captured. According to another embodiment, a separate camera module 180 and image sensor 320 may be excluded from the front side. In this case, as shown in FIG. 3C, as the entirety of the front side of the electronic device 101 may be substantially covered with the display 210, a full active area (full A/A) of the display 210 may be implemented.

According to an embodiment, the illuminance sensor 330 may be disposed to overlap at least one area of the display 210 in the top view over the front side of the housing 310, as shown in FIGS. 3A-3C. The illuminance sensor 330 may be disposed between the display 210 and a back side of the housing 310. The illuminance sensor 330 may be disposed under at least one area of the display 210, for example, under an active area of the display 210. The illuminance sensor 330 may be mounted at the back side of the display 210. The illuminance sensor 330 may be mounted on a portion of the back side of the display 210 adjacent to the image sensor 320. For example, as illustrated in FIG. 3A, the illuminance sensor 330 may be disposed at an upper right edge of the display 210. As another example, as illustrated in FIG. 3B, the illuminance sensor 330 may be disposed at an upper left edge of the display 210. As another example, as illustrated in FIG. 3C, the illuminance sensor 330 may be disposed at an upper center of the display 210. The illuminance sensor 330 may measure the illuminance of the external environment of the electronic device 101. The illuminance sensor 330 may receive light from the external environment and measure, identify, or determine the illuminance of the environment in which the electronic device 101 is positioned.

According to an embodiment, the illuminance sensor 330 may include any kind of sensor that utilizes intensity of external light, and may be a visible light sensor, a proximity illuminance sensor, a spectrometer sensor, an ultraviolet (UV) sensor, etc. The illuminance sensor 330 may include a light receiving element such as a photo diode (PD) capable of receiving the external light.

According to an embodiment, the illuminance sensor 330 may be affected by the change in transmittance of the external light by the display 210 and the screen (e.g. content) displayed on the display 210 when the illuminance sensor 330 is attempting to measure illuminance. For example, when the display 210 is a liquid crystal display (LCD) including a back light, the transmittance of the external light incident to the illuminance sensor 330 may be decreased by the back light. As another example, an organic light emitting diode (OLED) or a quantum dot light emitting diode (QLED) in which each pixel emits light individually may increase the illuminance value measured by the illuminance sensor 330 due to the light emitted from each pixel.

Figure 4:
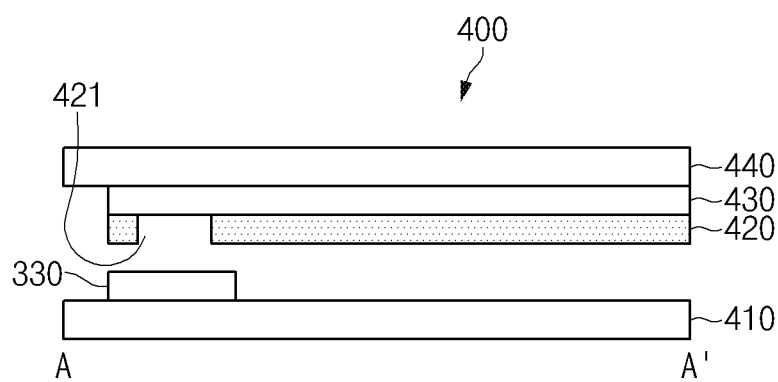
FIG. 4 is a cross-sectional view of an electronic device according to an embodiment of the disclosure.

FIG. 4 is a cross-sectional view 400 of an electronic device (e.g., the electronic device 101 of FIGS. 3A to 3C) according to an embodiment. The electronic device 101 may include a PCB 410 on which the illuminance sensor 330 is disposed, a cover panel 420, a panel 430, and/or a glass 440. In FIG. 4, when the electronic device 101 is upright, side A may be higher than side A'.

According to an embodiment, the PCB 410 may include a processor (e.g., the processor 120 of FIG. 1). The processor may acquire and process external illuminance information sensed by the illuminance sensor 330.

According to an embodiment, the cover panel 420 may be a layer for protecting one surface of the panel 430. The cover panel 420 may include a metal layer (e.g., a Cu sheet) and/or a light blocking layer (e.g., a black embossing layer).

According to an embodiment, the panel 430 may be disposed below at least a portion of the glass 440. The panel 430 may display be a display panel that displays contents, which may be transmitted through the transparent glass 440. That is, the panel 430 may be an active area of the display 210.

According to an embodiment, the cover panel 420 may be disposed under the panel 430. The illuminance sensor 330 may be disposed under the cover panel 420.

According to an embodiment, the illuminance sensor 330 may detect the external light passing through the glass 440 and the panel 430, and may measure external illuminance. The cover panel 420 may include the light blocking layer and may not allow the external light to pass through. An opening may be formed in at least a portion of the cover panel 420 above the illuminance sensor 330 such that external light may pass through the opening to arrive at the illuminance sensor 330. The opening 421 of the cover panel 420 may be formed at a position and/or size corresponding to a field of view (FOV) of the illuminance sensor 330.

Figure 5:
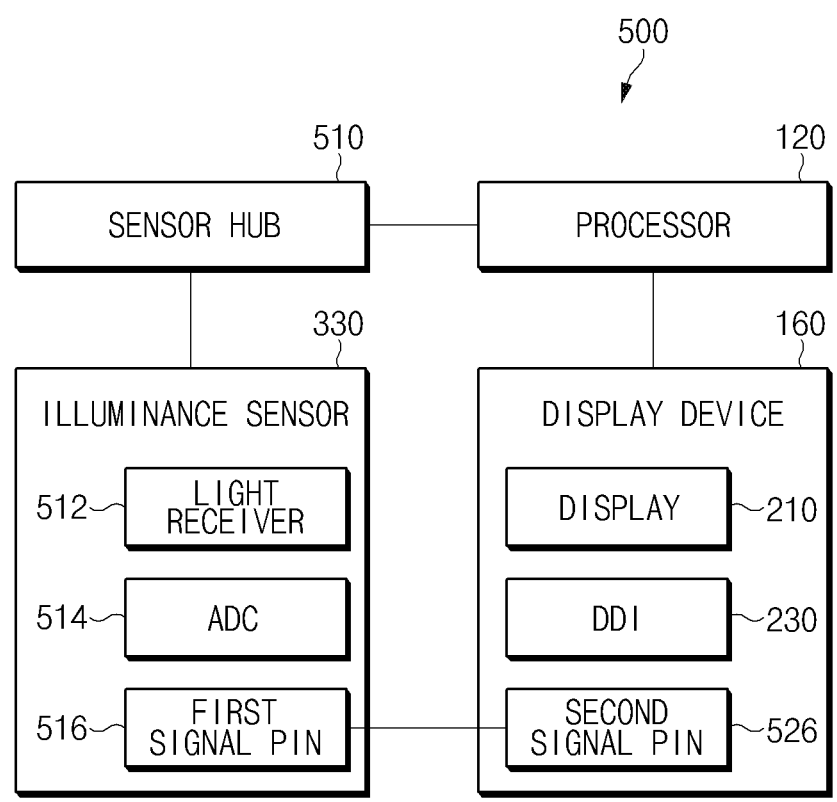
FIG. 5 is a block diagram illustrating a processor, a display device, an illumination sensor, and a sensor hub of an electronic device according to an embodiment.

FIG. 5 is a block diagram 500 illustrating the processor 120, the display device 160, the illuminance sensor 330, and a sensor hub 510 of the electronic device 101 according to an embodiment.

According to an embodiment, the processor 120 may be configured to execute instructions stored in the memory 130 to control the illuminance sensor 330 and/or the sensor hub 510 such that the illuminance sensor 330 may acquire external light. The processor 120 may be further configured to execute the instructions stored in the memory 130 to change the brightness of the display 210 of the display device 160. The processor 120 may receive information associated with the light that is acquired by the illuminance sensor 330 through the sensor hub 510. The processor 120 may determine the brightness or the luminance of the screen displayed by the display 210, based on the information associated with the light.

According to an embodiment, the processor 120 may control a light receiver 512 so that the illuminance sensor 330 acquires the external light. The processor 120 may set the light receiver 512 to be on, in which the external light may be received, or to be off, in which the light receiver 521 is not receiving the external light or is not consuming power.

According to an embodiment, the sensor hub 510 may control an operation of the illuminance sensor 330. The sensor hub 510 may be associated with the processor 120. The sensor hub 510 may include a supplementary processor. The sensor hub 510 may be a component of the processor 120 or separate from the processor 120. The sensor hub 510 may control at least some of the operations of the illuminance sensor 330. The sensor hub 510 may operate at low power (e.g. be operating when the electronic device 101 is in a sleep state).

According to an embodiment, the illuminance sensor 330 may include the light receiver 512, an analog-to-digital converter (ADC) 514, and/or a first signal pin 516.

According to an embodiment, the light receiver 512 may collect the external light from the external environment in the immediate vicinity of the electronic device 101. The light receiver 512 may detect light that is scattered around the electronic device 101. The light receiver 512 may include channels capable of measuring the external light. The light receiver 512 may generate analog data about the external light, based on the external light that is acquired through at least one channel. The analog data may be received at specified periods, or may be received depending on an occurrence of a specific event (e.g. an interrupt).

According to an embodiment, the ADC 514 may convert the analog data generated by the light receiver 512 into digital data. The ADC 514 may provide the converted digital data to the sensor hub 510.

According to an embodiment, the first signal pin 516 may be connected to a second signal pin 526 of the display device 160. The first signal pin 516 and the second signal pin 526 may transfer signals and/or data between the illuminance sensor 330 and the display device 160. The first signal pin 516 may provide the illuminance information to the second signal pin 526.

According to an embodiment, the display device 160 may include the display 210, the DDI display driver interface (DDI) 230, and/or the second signal pin 526.

According to an embodiment, the display 210 may provide contents such as a screen. The DDI 230 may output signals and/or data associated with the operations of the display 210. The DDI 230 may control the brightness of the screen displayed by the display 210. The second signal pin 526 may provide the luminance information of the display 210 to the first signal pin 516.

Figure 6:
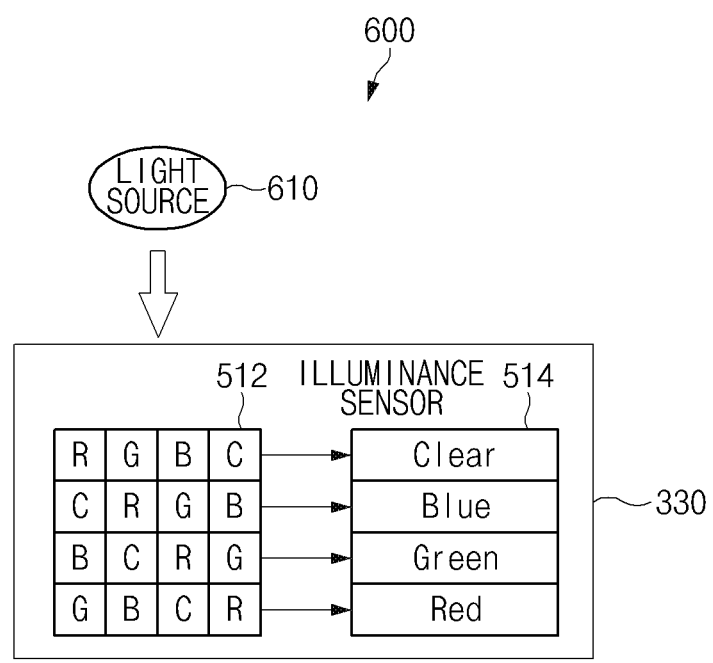
FIG. 6 is a block diagram illustrating a light receiver and an ADC of an illuminance sensor when acquiring external light from a light source according to an embodiment.

FIG. 6 is a block diagram 600 illustrating the light receiver 512 and the ADC 514 of the illuminance sensor 330 when acquiring external light from a light source 610 according to an embodiment.

According to an embodiment, the light receiver 512 may include an R (red) channel, a G (green) channel, a B (blue) channel, and a C (clear) channel. The B channel may be used to receive external light in about the 450 nm (nanometer) band, the G channel may be used to receive external light in about the 550 nm band, the R channel may be used to receive external light in about the 650 nm band, and the C channel may be used to receive external light of all the bands corresponding to visible light. The channels may include a number of measuring elements capable of measuring light. For example, each of the R channel, the G channel, the B channel, and the C channel may include a photo diode capable of receiving the visible light.

According to an embodiment, the light receiver 512 may generate data associated with illuminance based on the external light acquired from the light source 610. The data associated with illuminance may be referred to as raw data or the analog data. The data associated with illuminance may include at least one of an R value representing the magnitude of light associated with the R channel, a G value representing the magnitude of light associated with the G channel, a B value representing the magnitude of light associated with the B channel, and/or a C value representing the magnitude of light associated with the C channel. Depending on types of the light source 610 (e.g., halogen, incandescent, fluorescent, or natural light) that is received through the light receiver 512, the R value, the G value, the B value, and the C value may have different magnitudes. The light receiver 512 may provide data associated with the illuminance to the ADC 514.

According to an embodiment, the ADC 514 may receive the data associated with the illuminance from the light receiver 512. The ADC 514 may convert data associated with the illuminance into digital data. For example, the ADC 514 may convert at least one of the R value, the G value, the B value, and the C value in the analog data into digital data. The digital data that are converted from the analog data may be provided to the processor 120 or the sensor hub 510.

Figure 7:
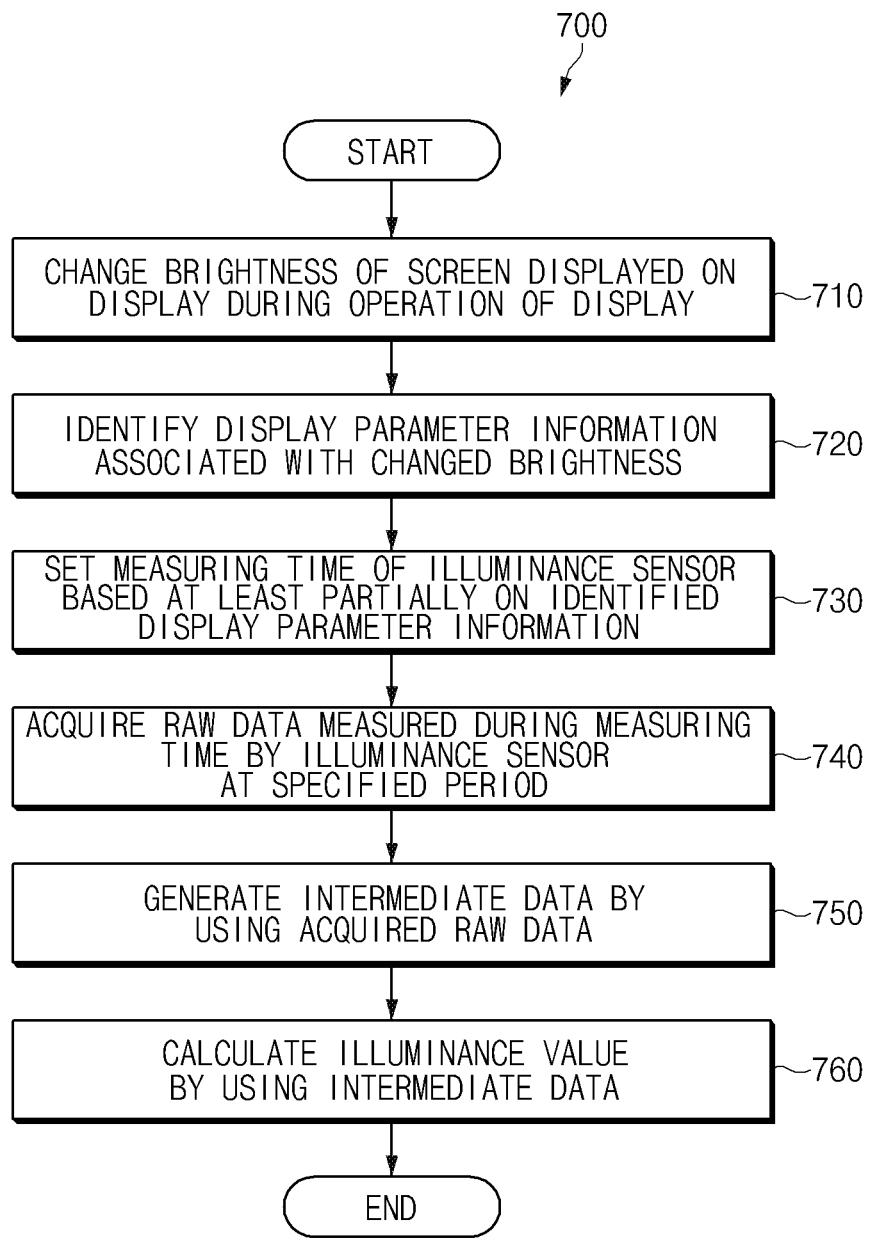
FIG. 7 is a flowchart illustrating a method of measuring an external illuminance by an electronic device using an illuminance sensor according to an embodiment.

FIG. 7 is a flowchart 700 illustrating a method of measuring an external illuminance by an electronic device 101 using an illuminance sensor 330 according to an embodiment. In operation 710, the electronic device 101 according to an embodiment may change the brightness of the screen displayed on the display 210 during the operation of the display 210. The processor 120 may change the brightness, based on contents of the screen displayed on the display 210 or a use state of the electronic device 101. For example, the processor 120 may increase the brightness of the display 210 when the input device 150 receives a command and/or an input of the user. As another example, the processor 120 may decrease the brightness of the display 210 when the electronic device 101 maintains the standby state for a specified amount of time or when the display 210 displays the same static screen for a specified amount of time.

In operation 720, the electronic device 101 according to an embodiment may identify display parameter information associated with the changed brightness. The display parameter information may be a ratio value for when the display 210 is turned off in a given frame.

According to an embodiment, the amount of time for which the display 210 displays a static image of the screen may be referred to a 1 frame. For example, when the electronic device 101 has a frame frequency of about 60 Hz, one frame may be about 16.67 ms.

According to an embodiment, the display parameter information may be an AMOLED off ratio (AOR) value of the display 210, which is a proportion of the time at which the display 210 is turned off. When the brightness of the display 210 is changed, the processor 120 may transfer the AOR to the sensor hub 510 in real time. The AOR may be a parameter corresponding to when the brightness or the luminance of the display 210 is adjusted. A brightness coefficient of the display 210 may be generated based on a base brightness and the AOR value.

According to an embodiment, the display parameter information may increase as the brightness of the screen displayed on the display 210 decreases. Measuring time of the illuminance sensor 330 (explained in detail below) may increase in proportion to the display parameter information.

In operation 730, the electronic device 101 according to an embodiment may set the measuring time of the illuminance sensor 330, based at least partially on the identified display parameter information. The measuring time may be the time period in which the illuminance sensor is on. The measuring time may reflect whether the display 210 is turned off, a frame length of the display 210, and/or the brightness of the display 210. For example, in an interval in which the display 210 is turned on, the measured value of the external light may be distorted due to influence of the screen output from the display 210. Accordingly, the measuring time may be set to exclude the interval in which the display 210 is turned on. According to an embodiment, at least a part of the interval in which the display 210 is turned off may be set as the measuring time of the illuminance sensor 330.

According to an embodiment, when the brightness of the display 210 is changed, the processor 120 may receive a turn-off interval of the display 210 in real time and change an integration start time.

According to an embodiment, the processor 120 may change the integration start, based on the length of one of the plurality of duty cycles included in a frame of the display 210. The duty cycle may be a time interval from when the display 210 is turned on to when the display is subsequently turned on again. The processor 120 may set the measuring time to a time period shorter than a duty cycle of the display 210 such that at least one valid data point regarding external illuminance may be acquired within one frame. In operation 740, the electronic device 101 according to an embodiment may acquire raw data measured during the measuring time by the illuminance sensor 330 at a specified period. The raw data may be measured by the illuminance sensor 330 during the measuring time. The processor 120 may read the raw data measured by the illuminance sensor 330 at a specified period. For example, the processor 120 may poll or sample every 20 ms to read the raw data measured by the illuminance sensor 330. The processor 120 may acquire the raw data measured by the illuminance sensor 330 during the set measuring time.

In operation 750, the electronic device 101 according to an embodiment may generate an intermediate data using the acquired raw data. The processor 120 may generate the intermediate data by using at least some of the raw data selected depending on specified criteria. For example, the processor 120 may select raw data values for a certain number of frames (e.g., five frames), and may generate the intermediate data based on the selected raw data values excluding the lowest value among the selected values. As another example, the processor 120 may generate the intermediate data by selecting an average value among the raw data in a specified period.

In operation 760, the electronic device 101 according to an embodiment may calculate the illuminance value using the intermediate data. For example, the processor 120 may generate the intermediate data a set number of times (e.g., five times), and then may calculate an average value of values while excluding the minimum and maximum values (e.g., middle 3 values excluding minimum value and maximum value of the 5 values) as a final illuminance value.

Figure 8:
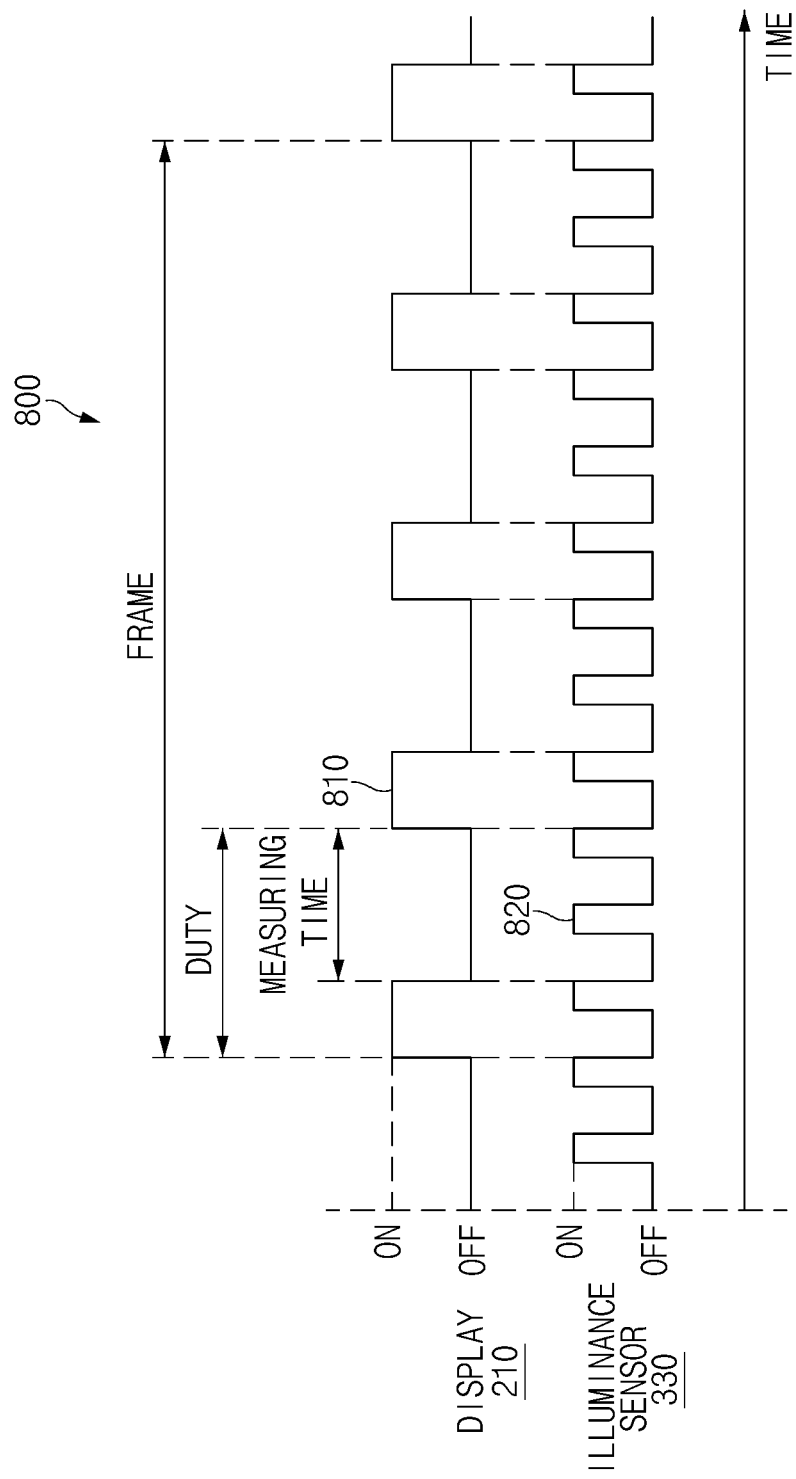
FIG. 8 is a timing diagram illustrating an operation state over a time period of a display and an illuminance sensor of an electronic device according to an embodiment.

FIG. 8 is a timing diagram 800 illustrating an operation state over a time period of the display 210 and the illuminance sensor 330 of the electronic device 101 according to an embodiment.

According to an embodiment, the display 210 may have a first operating state 810 where it repeatedly turns ON and OFF during one frame. The interval of the frame may be a time period when all of the scan lines of the display 210 sequentially operate. The display 210 may have a plurality of duty cycles during the one frame. The display 210 may include one turn-on interval and one turn-off interval within one duty cycle, while there may be multiple duty cycles in the one frame.

According to an embodiment, the illuminance sensor 330 may have a second operating state 820 where it repeatedly turns ON and OFF during the one frame. The period during which the illuminance sensor 330 is turned on and turned off (i.e. the duty cycle of the illuminance sensor 330) may be shorter than the duty cycle of the display 210.

According to an embodiment, four duty cycles of the display 210 may be included in one frame interval of the display 210. The processor 120 may set a turn-on interval of the illuminance sensor 330 to be shorter than a turn-off interval at one duty. The processor 120 may continuously read values sensed by the illuminance sensor 330 in the turn-on interval of the illuminance sensor 330. The processor 120 may detect the illuminance value in the interval in which the display 210 is turned off.

Figure 9:
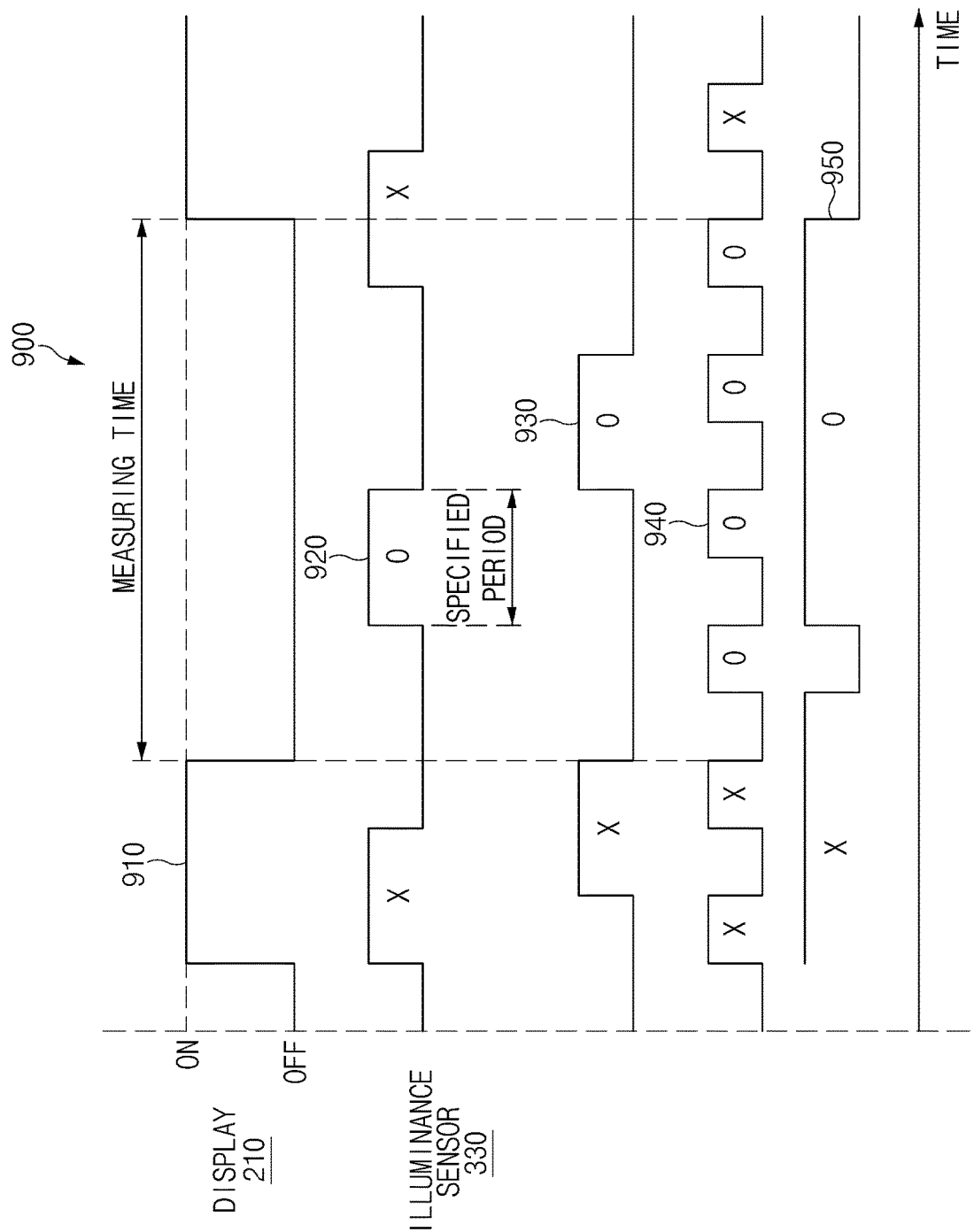
FIG. 9 is a timing diagram illustrating that an illuminance sensor of an electronic device changes an operation period and an operation time depending on an operation state of a display according to an embodiment.

FIG. 9 is a timing diagram 900 illustrating that the illuminance sensor 330 of the electronic device 101 changes an operation period and an operation time depending on an operation state of the display 210 according to an embodiment.

According to an embodiment, the processor 120 may analyze an operating state of the display 210, represented by first graph 910. The processor 120 may set the turn-on interval of the illuminance sensor 330 to coincide with the turn-off interval that is included in one duty cycle of the display 210. When the turn-on interval of the illuminance sensor 330 is included in the turn-off interval of the display 210, the processor 120 may determine that the raw data for measuring illuminance are available (denoted in FIG. 9 as "O"). When the turn-on interval of the illuminance sensor 330 at least partially coincides with the turn-on interval of the display 210, the processor 120 may determine that the raw data for measuring illuminance are unavailable (denoted in FIG. 9 as "X").

According to an embodiment, the measuring time for sensing illuminance by the illuminance sensor 330 may be represented as second graph 920. The measuring time for sensing illuminance by the illuminance sensor 330 may at least partially overlap with when the display 210 is turned on. When this happens, the processor 120 may delay the measuring time by a specified interval. The processor 120 may set the specified interval based on the operation state of the display 210, represented by first graph 910. The processor 120 may delay when the measuring time starts such that all turn-on intervals of the illuminance sensor 330 coincide with intervals in which the display 210 is turned off within a specific number of frames (e.g., 5 frames). For example, the processor 120 may set the measuring time of the illuminance sensor 330 as illustrated in the second graph 920 to a value smaller than the operation period of the illuminance sensor 330, and then may sequentially delay the operation timing, such that all turn-on intervals of the illuminance sensor 330 are included in the turn-off interval of the display 210. The third graph 930 may represent the operating states of the illuminance sensor 330.

According to an embodiment, the processor 120 may decrease the measuring time when the measuring time for sensing the illuminance by the illuminance sensor 330 at least partially coincides with when the display 210 is turned on. But at the same time, the processor 120 may increase the duty cycle of the illuminance sensor 330. For example, the processor 120 may decrease the measuring time of the illuminance sensor 330 as illustrated in the fourth graph 940 as compared to the second graph 920, such that the turn-off interval of the display 210 may include a plurality of turn-on intervals of the illuminance sensor 330.

According to an embodiment, while the processor 120 delays the operation timing of the illuminance sensor 330 by the specified interval, the processor 120 may find a frame in which all of the turn-on intervals of the illuminance sensor 330 in that frame are included in the turn-off interval of the display 210. In this case, the processor 120 may delay the operation timing of the illuminance sensor 330 while maintaining the measuring time or the duty cycle of the illuminance sensor 330. Thus, even though the current frame does not satisfy the condition where all the turn-on intervals of the illuminance sensor 330 for the current frame are included in the turn-off interval of the display 210, all the turn-on intervals of the illuminance sensor 330 for a subsequent frame may be included in the interval in which the display 210 is turned off. To maximize the accuracy of the illuminance reading, all of the turn-on intervals of the illuminance sensor 330 for a given frame may be included in the turn-off interval of the display 210. For example, a fifth graph 950 of the illuminance sensor 330 may indicate a state in which the illuminance sensor 330 is continuously turned on during the turn-off interval of the display 210.

Figure 10:
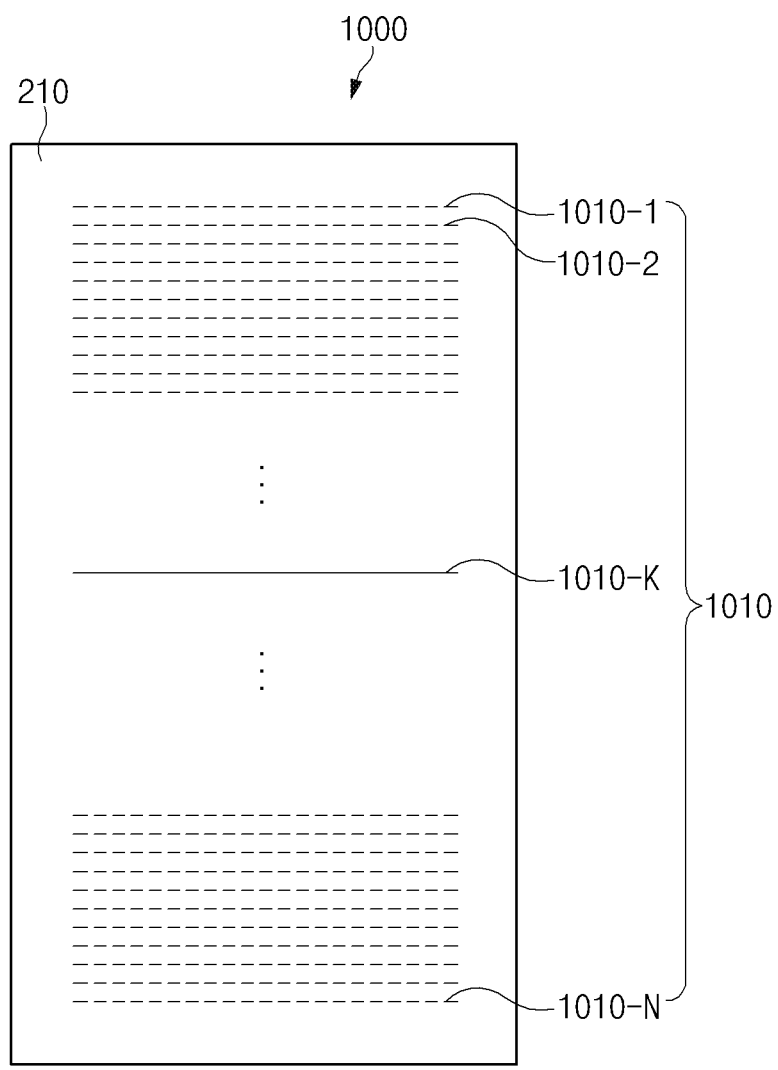
FIG. 10 is a diagram illustrating scan lines included in a display of an electronic device according to an embodiment.

FIG. 10 is a diagram 1000 illustrating scan lines 1010 included in the display 210 of the electronic device 101 according to an embodiment.

According to an embodiment, each of the scan lines 1010 may be a set of a plurality of pixels that are arranged in the same row. The scan lines 1010 may include first to Nth scan lines 1010-1 to 1010-N. The first to Nth scan lines 1010-1 to 1010-N may be turned on and/or off in various ways. For example, the plurality of pixels included in the first to Nth scan lines 1010-1 to 1010-N may be sequentially turned on, i.e., pixels included in the first scan line 1010-1 to pixels included in the Nth scan line 1010-N may be sequentially turned on. This sequential operation of the scan lines generate an image displayed on the display 210.

Figure 11:
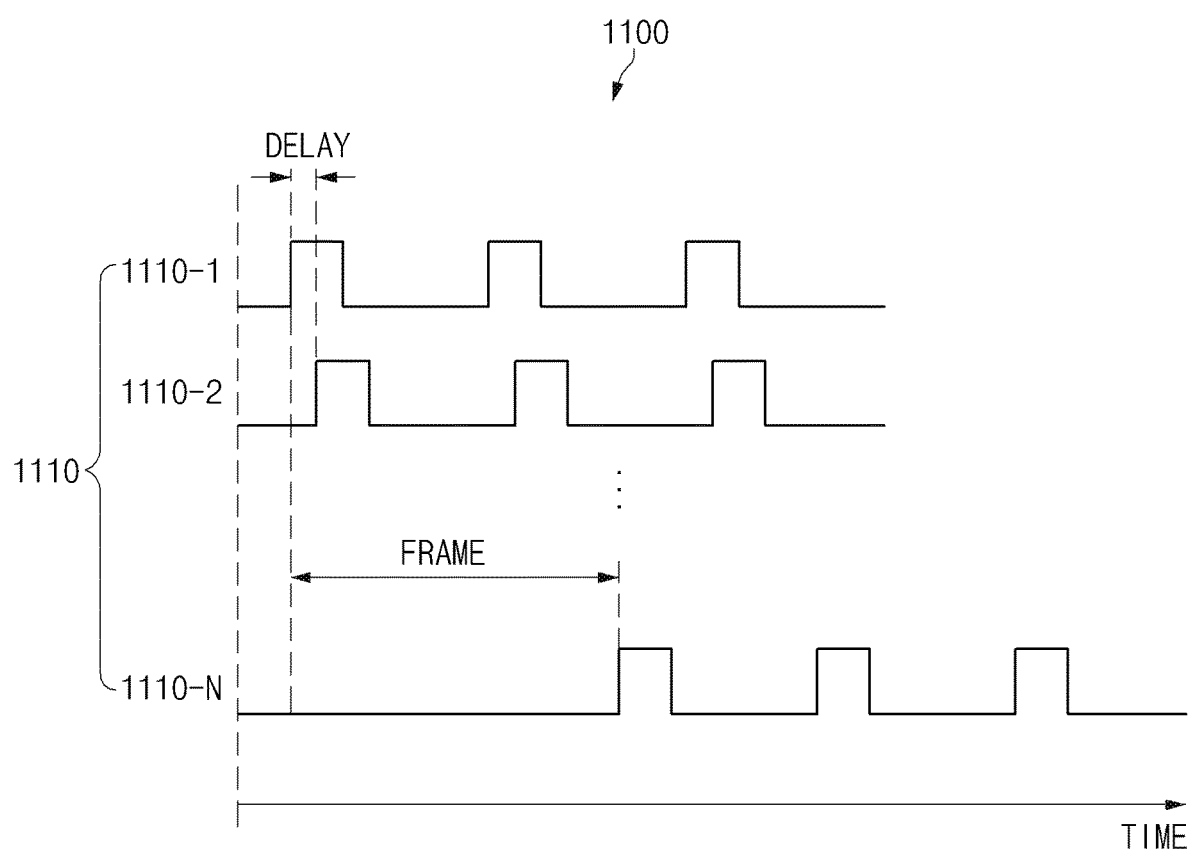
FIG. 11 is a timing diagram illustrating an operation of scan lines that are included in a display of an electronic device according to an embodiment.

FIG. 11 is a timing diagram 1100 illustrating an operation of scan lines 1110 that are included in the display 210 of the electronic device 101 according to an embodiment.

According to an embodiment, the scan lines 1110 may repeatedly turn on and turn off when operating. The scan lines 1110 may operate sequentially. The second scan line 1110-2 may be turned on after a specified time elapses since the first scan line 1110-1 is turned on. The time difference between the time when the first scan line 1110-1 is turned on and the time when the second scan line 1110-2 is turned on may be the delay. The time difference between the time when the first scan line 1110-1 is turned on and the time when the Nth scan line 1110-N is turned on may be a frame.

According to an embodiment, when the display 210 operates, the second scan line 1110-2 may be turned on after the first scan line 1110-1 is turned on, and the scan line 1110-1 to 1110-N may be turned on sequentially. The processor 120 may set the turn-on interval and/or the measuring time of the illuminance sensor 330 in consideration of the delay occurring between the scan lines 1110.

Figure 12:
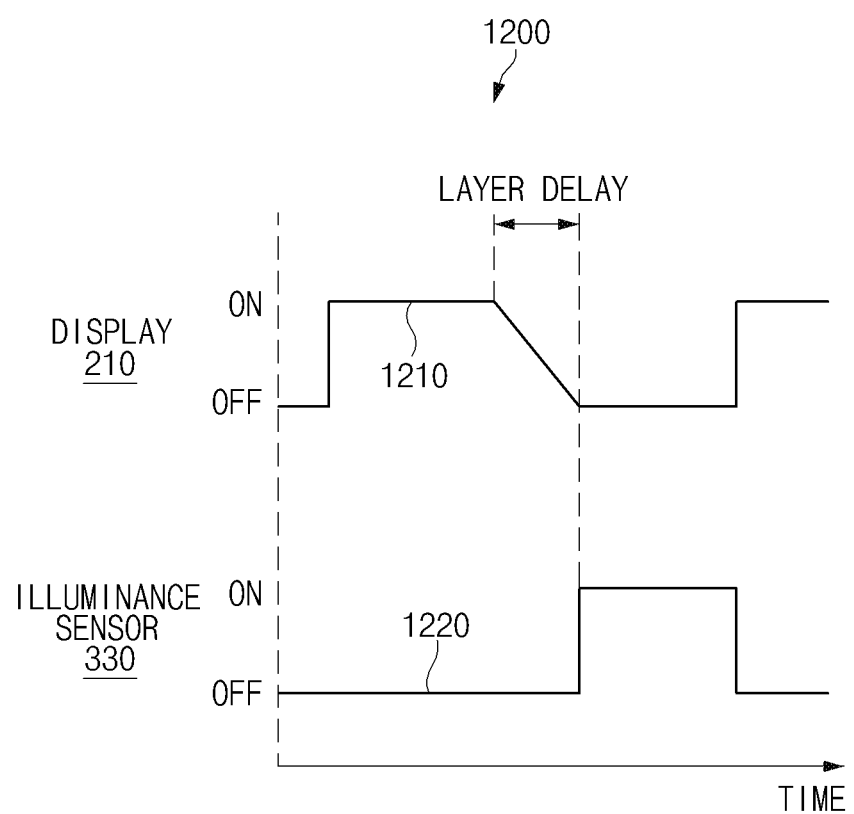
FIG. 12 is a timing diagram illustrating an operating state including a layer delay of a display of an electronic device and an operating state of an illuminance sensor corresponding thereto according to an embodiment.

FIG. 12 is a timing diagram 1200 illustrating an operating state including a layer delay of the display 210 of the electronic device 101 and an operating state of the illuminance sensor 330 corresponding thereto according to an embodiment.

According to an embodiment, the display 210 may operate in a first operating state 1210. The display 210 may have the layer delay when entering the turn-off interval after being turned on. The layer delay may be generated by a sequential operation of the scan lines 1110. The display 210 may enter the turn-off state after elapse of the layer delay interval. The display 210 may be partially turned on during the layer delay interval, thereby interfering with external illuminance measuring by the illuminance sensor 330.

According to an embodiment, the illuminance sensor 330 may operate in a second operating state 1220. The illuminance sensor 330 may be turned on after the elapse of the layer delay interval.

According to an embodiment, when the plurality of scan lines 1110 are sequentially driven, the processor 120 may calculate the measuring time while taking into consideration the layer delay. For example, when there are 30 scan lines, the layer delay of about 170 μs may occur due to a delay of about 5.7 μs per each scan line. When calculating the measuring time, the processor 120 may calculate the measuring time to be shorter than the theoretical turn-off interval of the display by about 170 μs.

According to an embodiment, the processor 120 may decrease the measuring time by an interval longer than the layer delay. Considering irregular reflection occurring in the display 210 or a margin between vertical scanning lines, the illuminance sensor 330 may be maintained in the turn-off state for a longer time than the layer delay of the display 210. For example, when the layer delay of about 170 μs occurs, the measuring time may be 300 μs less than the theoretical turn-off interval of the display.

An electronic device (e.g., the electronic device 101 of FIG. 3) according to an embodiment may include a housing (e.g., the housing 310 of FIG. 3) including a front side and a back side facing in a direction opposite to the front side, a display (e.g., the display 210 of FIG. 3) contained within the housing 310 and be visible through a portion of the front side, an illuminance sensor (e.g., the illuminance sensor 330 of FIG. 3) disposed between the display 210 and the back side of the housing to overlap at least one active area of the display 210 in a top view from above the front side, at least one processor (e.g., the processor 120 of FIG. 1) positioned inside the housing 310 and operatively connected to the display and the illuminance sensor 330, and a memory (e.g., the memory 130 of FIG. 1) positioned within the housing 310 and operatively connected to the at least one processor 120. Wherein the memory 130 stores instructions that, when executed, cause the at least one processor 120, while the display 210 is in operation, to change (e.g., operation 710 of FIG. 7) a brightness of a screen displayed on the display 210, to identify (e.g., operation 720 of FIG. 7) display parameter information associated with the changed brightness, to set (e.g., operation 730 of FIG. 7) a measuring time of the illuminance sensor, based at least partially on the identified display parameter information, to acquire (e.g., operation 740 of FIG. 7) raw data measured during the measuring time, by the illuminance sensor 330 at a specified period, to generate (e.g., operation 750 of FIG. 7) intermediate data, using the acquired raw data, and to calculate (e.g., operation 760 of FIG. 7) an illuminance value, using the generated intermediate data.

According to an embodiment, the display parameter information may include AOR (AMOLED off ratio) information of the display 210.

According to an embodiment, the instructions cause that the at least one processor 120 to set the measuring time of the illuminance sensor 330 to coincide with an interval at which the display 210 is turned off.

According to an embodiment, the instructions cause the at least one processor 120 to turn off the display 210 during a first interval, and during a second interval having a length less than or equal to the first interval, to turn on the illuminance sensor 330 to start the measuring time, and the second interval may overlap the first interval.

According to an embodiment, the display parameter information may increase as the brightness of the screen displayed on the display 210 decreases, and the measuring time may increase in proportion to the display parameter information.

According to an embodiment, the instructions cause the at least one processor 120 to select raw data having a minimum value among the raw data acquired during the specified period and to generate the intermediate data based on the selected raw data having the minimum value.

According to an embodiment, the instructions cause the at least one processor 120 to calculate, as the illuminance value, an average value of the intermediate data excluding intermediate data having a minimum value.

According to an embodiment, the instructions cause the at least one processor 120 sequentially to delay a start time of the measuring time by a specified interval when the start time of the measuring time overlaps with a time at which the display 210 is turned on.

According to an embodiment, the measuring time occurs outside a layer delay interval that is generated when scan lines of the display are sequentially turned on.

A method for measuring an illuminance using the illuminance sensor 330 by the electronic device 101 with the illuminance sensor 330 mounted at a back side of the a display 210 according to an embodiment may include changing (operation 710) a brightness of a screen displayed on a display, identifying (operation 720) display parameter information associated with the changed brightness, setting (operation 730) a measuring time of the illuminance sensor, based at least partially on the identified display parameter information, acquiring (operation 740) raw data measured during the measuring time by the illuminance sensor at a specified period, generating (operation 750) intermediate data using the acquired raw data, and calculating (operation 760) an illuminance value using the generated intermediate data.

An electronic device (101) according to an embodiment may include a housing (310) including a front side and a back side facing in a direction opposite to the front side, a display (210) contained within the housing (310) and be visible through a portion of the front side, an image sensor (e.g., the image sensor 320 of FIG. 3) disposed in at least a portion of a black matrix area surrounding an active area of the display (210), an illuminance sensor (330) mounted on a portion of the back side of the display adjacent to the image sensor (320) to overlap at least a portion of the active area of the display (210) in a top view from above the front side, at least one processor (120) operatively connected to the display (210), the image sensor (320), and the illuminance sensor (330), and a memory (130) positioned within the housing (310) and operatively connected to the at least one processor (120). The memory (130) stores instructions that, when executed, cause the at least one processor (120), while the display (120) is in operation, and when a brightness of the display (120) is changed, to transfer an AOR (AMOLED off ratio) to the illuminance sensor (330) in real time, where the AOR is a proportion of the time when the display is turned off in association with the changed brightness, to set a measuring time at which the illuminance sensor (330) receives raw data, using the AOR, to acquire the raw data measured during the measuring time by the illuminance sensor (330) at a specified period, to generate intermediate data including a lowest value of the raw data, and to calculate an average of values excluding the lowest value as an illuminance value.

According to an embodiment, the instructions cause the at least one processor (120) to set a start of the measuring time to overlap with a frame in which scan lines (e.g., the scan lines 1110 of FIG. 10) of the display (210) operate sequentially.

According to certain embodiments disclosed in the disclosure, an electronic device having an illuminance sensor mounted at a back side of a display may accurately measure an illuminance value, using the illuminance sensor.

In addition, various effects that are directly or indirectly identified through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a housing including a front side and a back side facing in a direction opposite to the front side;
a display disposed within the housing and visible through a portion of the front side, the display including a plurality of AMOLEDs;
an illuminance sensor disposed between the display and the back side of the housing to overlap at least one active area of the display in a top view from above the front side;
at least one processor disposed inside the housing and operatively connected to the display and the illuminance sensor; and
a memory disposed within the housing and operatively connected to the at least one processor,
wherein the memory stores instructions that, when executed by the at least one processor, cause the at least one processor, while the display is in operation, to:
in response to a change in brightness of a screen displayed on the display, determine an AOR (AMOLED Off Ratio), wherein the AOR is a ratio of OFF time period of the plurality of AMOLEDs, as divided by total time period aggregating an ON time period of the plurality of AMOLEDs plus the OFF time period;
determine a first interval in which the display is deactivated based on the AOR;
set a measuring time of the illuminance sensor as a second interval based on the first interval, wherein the second interval is shorter than the first interval and at least partly overlaps with the first interval;
acquire raw data measured during the measuring time by turning on the illuminance sensor for the second interval;
generate intermediate data using the acquired raw data;
calculate an illuminance value using the generated intermediate data; and
sequentially delay a start time of the measuring time by a specified interval when the start time of the measuring time overlaps with a time at which the display is turned on.

2. The electronic device of claim 1, wherein the instructions, when executed by the at least one processor, cause the at least one processor to set the measuring time of the illuminance sensor to coincide with an interval at which the display is turned off.

3. The electronic device of claim 1, wherein display parameter information increases as the brightness of the screen displayed on the display decreases, and
wherein the measuring time increases in proportion to the display parameter information.

4. The electronic device of claim 1, wherein the instructions, when executed by the at least one processor, cause the at least one processor to:
select raw data having a minimum value among the raw data acquired during a specified period; and generate the intermediate data based on the selected raw data having the minimum value.

5. The electronic device of claim 1, wherein the instructions, when executed by the at least one processor, cause the at least one processor to calculate, as the illuminance value, an average value of the intermediate data excluding intermediate data having a minimum value.

6. The electronic device of claim 1, wherein the measuring time occurs outside a layer delay interval that is generated when scan lines of the display are sequentially turned on.

7. An electronic device comprising:
a housing including a front side and a back side facing in a direction opposite to the front side;
a display configured to be disposed within the housing and to be visible through a portion of the front side;
an illuminance sensor configured to be disposed between the display and the back side of the housing to overlap at least one active area of the display in a top view from above the front side;
at least one processor configured to be disposed inside the housing and to be operatively connected to the display and the illuminance sensor; and
a memory configured to be disposed within the housing and to be operatively connected to the at least one processor,
wherein the memory stores instructions that, when executed by the at least one processor, cause the at least one processor, while the display is in operation, to:
change a brightness of a screen displayed on the display;
identify display parameter information associated with the change in brightness;
set a measuring time of the illuminance sensor, based at least partially on the identified display parameter information;
acquire raw data measured during the measuring time by the illuminance sensor at a specified period;
generate intermediate data using the acquired raw data;
calculate an illuminance value using the generated intermediate data; and
sequentially delay a start time of the measuring time by a specified interval when the start time of the measuring time overlaps with a time at which the display is turned on.

8. A method for measuring an illuminance using an illuminance sensor by an electronic device, the method comprising:
in response to a change in brightness of a screen displayed on a display, determine an AOR (AMOLED Off Ratio), wherein the AOR is a ratio of OFF time period of a plurality of AMOLEDs included in a display of the electronic device, as divided by total time period aggregating an ON time period of the plurality of AMOLEDs plus the OFF time period;
determining a first interval in which the display is deactivated based on the AOR;
setting a measuring time of the illuminance sensor as a second interval based on the first interval, wherein the second interval is shorter than the first interval and at least partly overlaps with the first interval;
acquiring raw data measured during the measuring time by turning on the illuminance sensor for the second interval;
generating intermediate data using the acquired raw data;
calculating an illuminance value using the generated intermediate data; and sequentially delaying a start time of the measuring time by a specified interval when the start time of the measuring time overlaps with a time at which the display is turned on.

9. The method of claim 8, further comprising setting the measuring time of the illuminance sensor to coincide with an interval at which the display is turned off.

10. The method of claim 8, further comprising:
turning off the display during a first interval; and
during the second interval that is shorter than the first interval, turning on the illuminance sensor to start the measuring time,
wherein the second interval overlaps the first interval.

11. The method of claim 10, wherein display parameter information increases as the brightness of the screen displayed on the display decreases, and
wherein the measuring time increases in proportion to the display parameter information.

12. An electronic device comprising:
a housing including a front side and a back side facing in a direction opposite to the front side;
a display disposed within the housing and visible through a portion of the front side, the display including a plurality of AMOLEDs;
an image sensor disposed in at least a portion of a black matrix area surrounding an active area of the display;
an illuminance sensor mounted on a portion of the back side of the display adjacent to the image sensor to overlap at least a portion of the active area of the display in a top view from above the front side;
at least one processor operatively connected to the display, the image sensor, and the illuminance sensor; and
a memory disposed within the housing and operatively connected to the at least one processor,
wherein the memory stores instructions that, when executed by the at least one processor, cause the at least one processor, while the display is in operation, to:
when a brightness of the display is changed, provide an AOR (AMOLED Off Ratio) to the illuminance sensor in real time, wherein the AOR indicates a ratio of OFF time period of the plurality of AMOLEDs, as divided by total time period aggregating an ON time period of the plurality of AMOLEDs plus the OFF time period;
set a measuring time at which the illuminance sensor receives raw data, using the AOR;
acquire the raw data measured during the measuring time by the illuminance sensor at a specified period;
generate intermediate data including a lowest value of the raw data, and
calculate an average of values excluding the lowest value as an illuminance value; and
sequentially delay a start time of the measuring time by a specified interval when the start time of the measuring time overlaps with a time at which the display is turned on.

13. The electronic device of claim 12, wherein the instructions, when executed by the at least one processor, cause the at least one processor to set a start of the measuring time to overlap with a frame in which scan lines of the display operate sequentially.

14. The electronic device of claim 12, wherein the instructions, when executed by the at least one processor, cause the at least one processor to increase the AOR as the brightness of the display decreases, and to increase the measuring time in proportion to the AOR.

15. The electronic device of claim 12, wherein the measuring time occurs outside a layer delay interval that is generated when scan lines of the display are sequentially turned on.

* * * * *